Aug. 28, 1951 K. J. FLECK ET AL 2,565,681
FUEL INJECTION FOR INTERNAL-COMBUSTION ENGINES
Filed Nov. 1, 1945 2 Sheets-Sheet 1
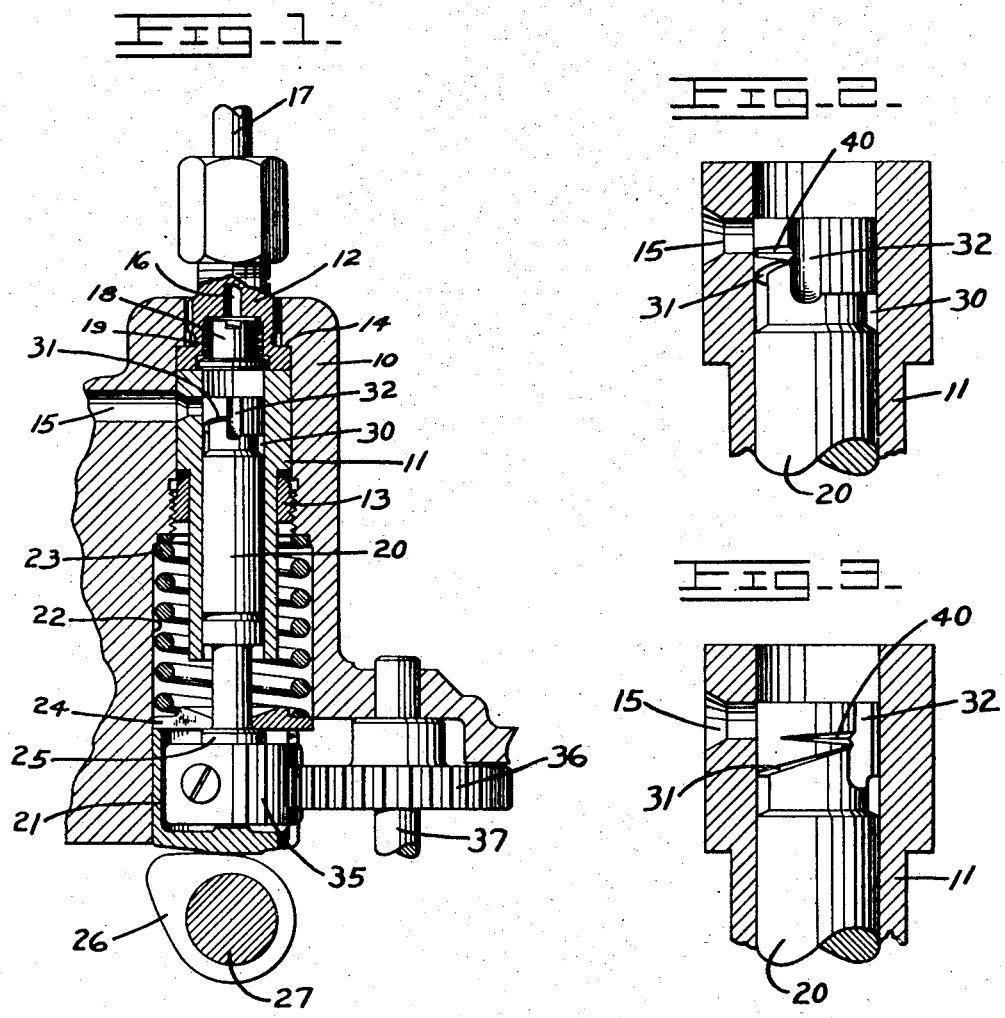
INVENTORS.
KENNETH J. FLECK
BY HAROLD H. WAGNER
Charles M. Fryer
ATTORNEY.

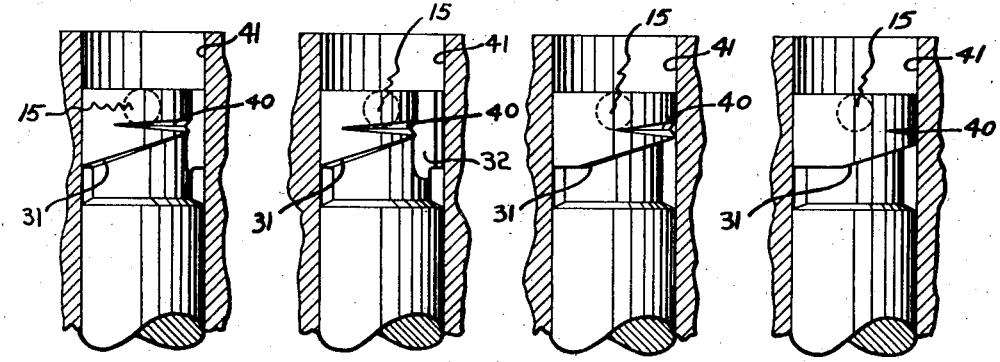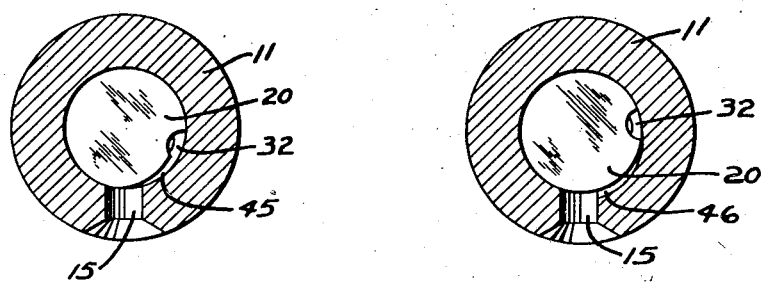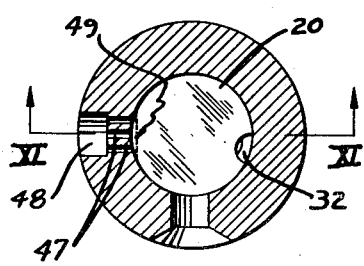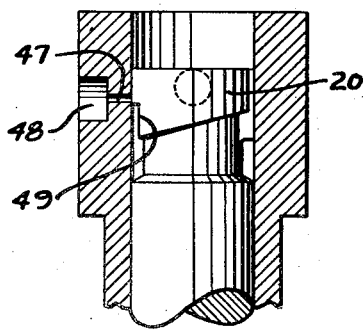

Patented Aug. 28, 1951

2,565,681

UNITED STATES PATENT OFFICE 2,565,681

FUEL INJECTION FOR INTERNAL-
COMBUSTION ENGINES

Kenneth J. Fleck, Peoria, and Harold H. Wagner, Washington, Ill., assignors to Caterpillar Tractor Co., San Leandro, Calif., a corporation of California Application November 1, 1945, Serial No. 626,074

1 Claim. (Cl. 121—139)

The present invention relates to fuel injection for internal combustion engines and particularly to a system of fuel injection by means of which an engine is caused to operate efficiently and quietly under all speeds and under all load conditions.

In internal combustion engines wherein solid fuel injection systems are employed, for example, the compression ignition type engine, the speed and load capacity of the engine are regulated by the volume of fuel injected into each cylinder for each power stroke of the piston therein. The most common method of injecting fuel into the cylinder includes the use of a fuel injection pump which contains a plunger reciprocated by cam action in timed relation to the operation of the engine piston. The injection pump receives fuel from a supply chamber and delivers it under high pressure into the cylinder in proper timing for ignition and combustion therein. The length of stroke of the fuel injection plunger is constant. However, the effective stroke is varied depending on engine speed and load conditions. Thus, in order to vary the amount of fuel injected by the plunger it has been common practice to utilize its full stroke for large volume injection and a relatively short portion of its stroke for small volume injection. One means of utilizing various portions of the full plunger stroke is that which includes a cut away portion in the plunger side with a so-called scroll edge which registers with the intake passages of the pump. This means will presently be more fully described. A characteristic of its operation, however, is that when the engine is operating at less than its full rated load capacity, the fuel injected by the plunger into the combustion chamber of the engine is still injected at full plunger pressure and during the initial part of the pressure stroke of the plunger. This results in all of the fuel necessary for idling or light load operation of the engine being supplied to the combustion chamber during the first part of the power stroke of the piston. It is well known that such fuel injection characteristics result in undesirable engine operation and in extremely noisy operation particularly at idling speeds.

It is an object of the present invention, therefore, to provide a method and apparatus for injecting fuel in internal combustion engines wherein the injection is accomplished at a rate which is in proportion to the fuel requirements so that when the fuel requirement is low the fuel will be injected relatively slowly. Another object of the invention is to overcome the cause of knocking or noisy operation during idling of engines by controlling fuel injection in a manner that is simple and readily adapted to use with conventional forms of fuel injection mechanism. Further and more specific objects and advantages of the invention are made apparent in the following specification wherein reference is made to the accompanying drawings showing various forms which the invention may assume.

In the drawings:

Fig. 1 is a vertical sectional view of a fuel pump and control mechanism therefor illustrating a typical arrangement with which the present invention is adapted to be used;

Fig. 2 is an enlarged fragmentary sectional view of a portion of the pump illustrated in Fig. 1 modified in accordance with the present invention;

Fig. 3 is a view similar to Fig. 2 with the pump plunger shown in an angularly adjusted position;

Figs. 4–7, inclusive, are diagrammatic views illustrating the pump plunger during its compression stroke in different positions of adjustment;

Figs. 8, 9 and 10 are diagrammatic illustrations in horizontal cross section of pumps embodying modified forms of the invention illustrated in Figs. 2–7, inclusive; and Fig. 11 is an enlarged section taken on the line XI—XI of Fig. 10.

In Fig. 1 of the drawings a typical fuel injection pump for a compression ignition type engine is illustrated as contained in a pump housing 10. The housing 10 has a central bore containing a pump cylinder 11 and a valve housing 12 which are held in place within the housing 10 by an internal nut 13 which urges them against a shoulder 14 in the bore of the housing. An inlet port 15 communicates with the pump cylinder 11 and supplies liquid fuel thereto, usually from a transfer chamber not shown to which fuel is constantly supplied from a main reservoir by a transfer pump which maintains the fuel in the transfer chamber at a relatively low pressure.

A discharge port 16 is formed in the valve housing 12 and communicates with a discharge line 17 by means of which fuel under high pressure is directed to the combustion chamber of the engine. The valve housing 12 contains a valve 18 which is seated against the upper end of the cylinder 11 by a spring 19 so that the valve 18 acts in the manner of a check valve and is opened by liquid pressure upon the pressure stroke of the plunger within the cylinder 11. This plunger is shown at 20 and projects beyond the open end of the cylinder 11 terminating in engagement with a cup 21 which is reciprocally mounted in an enlarged bore 22 of the pump housing 10. A spring 23 disposed within this bore engages a spring seat 24 resting on a collar 25 formed on the plunger and normally urges the plunger toward a retracted position.

A cam 26 fixed to a shaft 27, which is rotated upon operation of the engine in a conventional manner, engages the bottom of the cup 21 to effect its reciprocation and consequently to impart reciprocation to the pump plunger against the action of the spring 23. As the plunger is advanced past the intake port 15 it exerts pressure on the liquid fuel in the discharge end of the cylinder which is sufficient to open the check value 18 and advance the fuel through the line 17 to the combustion chamber of the engine. Ordinarily, the full stroke of the plunger would be effective but it is conventional practice to employ a metering structure which meters or regulates the volume of fuel injected into the engine in accordance with a setting of the engine governor. This metering structure comprises an annular groove 30 from which circumscribes the plunger a short distance from its head and which has an upper scroll edge 31 which varies in its distance from the head of the plunger gradually as it progresses around the periphery thereof. A passage 32 formed in the side of the plunger communicates between its head and the groove 30. Consequently, on the pressure stroke of the plunger the fuel in the cylinder is placed under compression the instant the head of the plunger closes the intake port 15 and is retained under pressure until the scroll edge 31 passes or opens the intake port 15. At this instant the high pressure is relieved through the passage 32 and groove 30 and is thus communicated back to the relatively low pressure of the intake passage 15 which communicates with the transfer chamber. Therefore, while the plunger 20 is reciprocated through a full stroke upon each rotation of the cam shaft 27, the length of its effective stroke is determined by the distance between the head of the plunger and the scroll edge 31 on the side which covers the intake port 15. This distance changes progressively around the plunger so that angular adjustment of the plunger is effective to increase or decrease the period of injection pressure and thus to meter the volume of fuel injected upon each pressure stroke of the plunger. Angular adjustment of the plunger may be accomplished through a gear 35 which is fixed to the plunger and shown as received within the cup 21. A gear 36 meshes with the gear 35 and is carried by a shaft 37 which, through conventional mechanism not disclosed, is connected with an engine governor. The setting of the governor controls the angular position of the plunger and the relationship of the scroll edge 31 to the intake port 15.

In the operation of the injection pump plunger with this conventional metering structure, the fuel injection to the engine cylinder always commences at the same time in the cycle of operation of the engine and when the engine is operated under very light load or is idling the entire volume of the small quantity of fuel injected into the combustion chamber is injected during the first part of the plunger stroke. The present invention provides for reducing the rate of injection when a smaller volume of fuel is required, which is tantamount to increasing the length of time for the injection period for a given quantity of fuel. This is accomplished by the structure illustrated in Figs. 2 and 3. In these figures, the plunger 20 is shown as identical with that shown in Fig. 1 with the exception that a tapered groove 40 is cut in the plunger wall in a position spaced from the head of the plunger and communicating at its larger end with the channel 32. This groove 40 is so positioned that during full volume adjustment of the metering structure, such as indicated in Fig. 3, which would occur when the engine was operating under heavy load, the groove would have no effect. However, in idling position which is indicated in Fig. 2, the governor controlled rotation or angular adjustment of the plunger 20 brings the groove 40 into registry with the intake port 15. Consequently, during the pressure stroke of the plunger some of the liquid fuel under pressure bleeds back through the channel 32 and through the groove 40 to the low pressure fuel with which the intake port 15 communicates. Thus the average pressure of the discharging fuel during idling of the engine is less than the fuel pressure at full load and the time required to effect its injection into the combustion chamber of the engine is longer. The bleeding back of a portion of the fuel does not, however, vary the volume of the fuel actually injected because the volume is controlled by the governor which is responsive to actual engine performance and the governor will effect angular adjustment of the plunger 20 to compensate for whatever quantity of fuel bleeds back.

Figs. 4 to 7, inclusive, show diagrammatically the angular position of the plunger with relation to the intake port under different operating conditions and in these views the plunger is illustrated as viewed from the side of the intake port. The cylinder walls are indicated at 41 and the position of the intake port is indicated in dotted lines at 15. In each of the four views the plunger is shown during its compression stroke just as it has closed the intake port and the distance between the lower edge of the intake port and the scroll edge 31 indicates the duration of fuel injection. Fig. 4 shows the plunger angularly adjusted for low idle operation. Fig. 5 is a high idle position. Fig. 6 is a part load position and Fig. 7 is a full load position. Fig. 7 illustrates the fact that, in full load position the bleeder groove 40 will not register with the intake port 15 during reciprocation of the plunger. In the other positions illustrated the tapered groove 40 registers with the intake port during the stroke of the piston and to provide a greater or less bleed back of fuel depending upon the angular adjustment of the plunger. In Figs. 4 and 5, for example, where the plunger is set for idling operation of the engine a considerable amount of fuel will escape through the channel 32 and bleed groove 40 so that in order to effect delivery of the required volume of fuel to the combustion engine, the governor will operate to rotate the plunger to the right as viewed in these figures and therefore to increase in time the duration of its effective fuel injecting stroke. As the governor tends to satisfy the requirements of the engine its adjustment of the plunger will just compensate the loss of fuel through the groove 40 and therefore the quantity of fuel delivered to the combustion chamber will remain constant though the rate of its injection has been varied.

Figs. 8, 9 and 10 show modifications of the structure herein described or other means than the tapered groove 40 for accomplishing the required reduction of fuel pressure during idling of the engine. In Fig. 8 the head of the plunger 20 is shown as having its side ground or lapped away as at 45 between the channel 32 and the intake port 15. By relieving the side of the piston between its pressure end and the scroll edge 31 in this manner an effect can be obtained which is similar to the effect obtained through the use of the groove 40.

In Fig. 9 the wall of the cylinder 11 has been cut away as indicated at 46 by grinding or broaching to produce the same effect as the structure shown in Fig. 8. With this structure angular adjustment of the piston 20 will bring the channel 32 thereof into registry with the gradually increased depth of the cut away portion 46.

Figs. 10 and 11 show another means of accomplishing bleed back where the plunger 20 is provided with a cut away portion 49 which, upon angular adjustment, comes into registry with one or more of a plurality of small ports 47 which communicate with a large bore 48 in the wall of the cylinder. The bore 48 may in turn communicate through suitable conduits (not shown) with the transfer chamber or with the intake port 15 which contains fuel under low pressure. The cut away portion 49 of course registers with the relieved portion of the plunger below the scroll edge of its metering means but the shape of this portion and the shape and arrangement of the ports 47 may be varied considerably as is suggested by this disclosure.

In the preferred form of the invention illustrated in Figs. 2 to 7, inclusive, the groove 40 is shown as V-shaped. This particular shape is not essential however as the groove may be of any cross sectional contour so long as its cross sectional area diminishes through its length. It is through this taper or gradually diminishing cross sectional area of the groove that the quantity of fuel bypassed through the groove is gradually increased upon angular adjustment of the plunger to decrease the volume of fuel delivered upon each stroke of the plunger.

The arrangement of the groove 40 as it is illustrated in Figs. 2 to 7 is such that its center line is substantially parallel to the plane of the plunger head. While this arrangement is desirable for manufacturing convenience it is not critical and the groove can be disposed at an angle to the position shown and still perform its intended function.

The forms of the invention illustrated in Figs. 2 to 7, inclusive, and Figs. 10 and 11 are preferred to the modifications illustrated in Figs. 8 and 9 as they may be embodied in a conventional fuel injection mechanism without varying the timing and other operating factors of the engine with which they are employed. For example, as illustrated in Figs. 4 to 7, inclusive, the groove 40 is spaced from the head of the plunger a distance which is substantially the diameter of the fuel inlet port 15. Consequently, the head of the plunger, on its injection stroke, will close the port 15 just before the groove 40 communicates with the port to relieve pressure. Thus substantially full pressure is obtained for initial injection insuring proper functioning of the injection valve and maintaining conventional timing. The ensuing reduction of pressure which occurs when fuel bleeds back through the groove 40 reduces the average rate of fuel injection to obtain the desired results previously described. It is, therefore, desirable that the groove 40 be spaced from the head of the plunger a distance comparable to the diameter of the fuel inlet port 15. In actual practice this distance may be slightly less than the diameter of the port 15 because the speed of the plunger is such that desired pressure may be obtained before final closing of the port and appreciable reduction of pressure may not start to take place until somewhat after the initial registration of the groove 40 with the intake port.

The structures herein illustrated have proven effective in the elimination of objectionable noise during idling operation, or operations under low load, of an engine without interfering in any manner with the engine performance at full load. They are also effective to reduce maximum cylinder pressures and the rate of combustion pressure rise with consequent reduction of load on the pistons and bearings of the engine.

We claim:

In a fuel injection pump having a cylinder with a fuel intake port in its wall, a reciprocable plunger with a head operating past said port, said plunger having a circumscribing groove spaced from said head with a scroll edge of varying distance from the head, a communicating channel between the head of the plunger and said groove to relieve pressure toward the intake port when the scroll edge registers with the port whereby angular adjustment of the plunger will vary its effective stroke, and means for bleeding fuel from the high pressure end of the plunger back to the intake port while the plunger is operating with a short effective stroke, said means including a relieved area in the plunger wall spaced from the plunger head a distance no greater than the diameter of the intake port to communicate between said channel and the intake port, said relieved area presenting a small cross section to limit the bleeding of fuel to a quantity that will effect a gradual reduction in fuel pressure immediately following the event of peak pressure which results as the head of the plunger closes the inlet port.

KENNETH J. FLECK.
HAROLD H. WAGNER.

REFERENCES CITED

The following references are of record in the file of this patent:

UNITED STATES PATENTS

| Number | Name | Date |
|---|---|---|
| 1,847,718 | Herr | Mar. 1, 1932 |
| 1,953,449 | Thege et al. | Apr. 3, 1934 |
| 1,966,694 | Vandet et al. | July 17, 1934 |
| 2,192,387 | Schlanpitz | Mar. 3, 1940 |
| 2,356,511 | Descourtis | Aug. 22, 1944 |

FOREIGN PATENTS

| Number | Country | Date |
|---|---|---|
| 171,126 | Switzerland | Nov. 1, 1934 |
| 514,011 | Great Britain | Apr. 25, 1939 |